United States Patent
Reynolds et al.

(10) Patent No.: US 10,046,424 B2
(45) Date of Patent: Aug. 14, 2018

(54) ROTORS WITH STALL MARGIN AND EFFICIENCY OPTIMIZATION AND METHODS FOR IMPROVING GAS TURBINE ENGINE PERFORMANCE THEREWITH

(71) Applicant: HONEYWELL INTERNATIONAL INC., Morristown, NJ (US)

(72) Inventors: Bruce David Reynolds, Chandler, AZ (US); John A. Gunaraj, Chandler, AZ (US); Timothy Gentry, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 702 days.

(21) Appl. No.: 14/471,253

(22) Filed: Aug. 28, 2014

(65) Prior Publication Data

US 2016/0059365 A1 Mar. 3, 2016

(51) Int. Cl.
*B23P 15/04* (2006.01)
*F01D 5/14* (2006.01)
(Continued)

(52) U.S. Cl.
CPC .............. *B23P 15/04* (2013.01); *F01D 5/141* (2013.01); *F01D 5/145* (2013.01); *F01D 5/288* (2013.01);
(Continued)

(58) Field of Classification Search
CPC .......... B23P 15/04; F01D 5/141; F01D 5/288; F01D 5/145; F04D 29/164; F04D 29/324;
(Continued)

(56) References Cited

U.S. PATENT DOCUMENTS

| | | | |
|---|---|---|---|
| 5,167,489 A | 12/1992 | Wadia et al. | |
| 6,283,705 B1* | 9/2001 | Rice | F01D 17/162 415/160 |

(Continued)

FOREIGN PATENT DOCUMENTS

| | | |
|---|---|---|
| EP | 1243797 A1 | 9/2002 |
| EP | 1712738 A2 | 10/2006 |

(Continued)

OTHER PUBLICATIONS

EP Extended Search Report for Application No. EP 15181483.7 dated Jan. 27, 2016.

(Continued)

*Primary Examiner* — Bayan Salone
(74) *Attorney, Agent, or Firm* — Lorenz & Kopf, LLP (57) ABSTRACT

Methods are provided for improving performance of a gas turbine engine comprising a component having a rotor mounted in a rotor casing and having rotor blades. A tip sweep is applied to a leading edge of one or more rotor blades each having a pressure sidewall and a circumferentially opposing suction sidewall extending in a radial direction between a root and a tip and in an axial direction between the leading edge and a trailing edge. One or more blade geometric design parameters are adjusted. A rotor casing treatment is applied to the rotor casing over at least one of the one or more rotor blades. The applying and adjusting steps are performed during design of the rotor and cause a measured stall margin to substantially match a required stall margin with an increase in efficiency of the component.

17 Claims, 9 Drawing Sheets

(51) Int. Cl.
*F01D 5/28* (2006.01)
*F04D 29/16* (2006.01)
*F04D 29/32* (2006.01)
*F04D 29/68* (2006.01)
*F04D 29/52* (2006.01)

(52) U.S. Cl.
CPC ......... *F04D 29/164* (2013.01); *F04D 29/324* (2013.01); *F04D 29/526* (2013.01); *F04D 29/685* (2013.01); *F05D 2220/36* (2013.01); *F05D 2240/307* (2013.01); *F05D 2250/294* (2013.01); *F05D 2250/38* (2013.01); *Y02T 50/673* (2013.01)

(58) Field of Classification Search
CPC .. F04D 29/526; F04D 29/685; F05D 2220/36; F05D 2240/307; F05D 2250/294; F05D 2250/38; Y10T 29/4932; Y10T 29/49323; Y10T 29/49325; Y02T 50/673
USPC .......... 29/889, 889.2, 889.22, 889.23; 415/1, 415/57.1, 57.3, 57.4, 58.2, 58.6, 58.7, 415/914; 703/9; 702/35, 138, 179
See application file for complete search history.

(56) References Cited

U.S. PATENT DOCUMENTS

| | | | | |
|---|---|---|---|---|
| 6,619,909 | B2* | 9/2003 | Barnett | F04D 27/02 415/119 |
| 7,374,403 | B2* | 5/2008 | Decker | F01D 5/141 416/223 A |
| 7,575,412 | B2* | 8/2009 | Seitz | F01D 5/145 415/58.5 |
| 8,251,648 | B2* | 8/2012 | Johann | F04D 29/685 415/173.1 |
| 8,517,677 | B2 | 8/2013 | Wood et al. | |
| 8,550,768 | B2* | 10/2013 | Montgomery | F01D 5/143 415/1 |
| 8,602,720 | B2 | 12/2013 | Goswami et al. | |
| 8,684,698 | B2* | 4/2014 | Breeze-Stringfellow | F01D 5/141 416/223 A |
| 9,115,594 | B2* | 8/2015 | Krautheim | F01D 11/10 |
| 2002/0131858 | A1* | 9/2002 | Adams | F01D 11/08 415/9 |
| 2006/0228206 | A1* | 10/2006 | Decker | F01D 5/141 415/1 |
| 2011/0299979 | A1* | 12/2011 | Montgomery | F01D 5/143 415/182.1 |

FOREIGN PATENT DOCUMENTS

| | | |
|---|---|---|
| EP | 1930598 A2 | 6/2008 |
| EP | 2484913 A2 | 8/2012 |

OTHER PUBLICATIONS

Madden, D.S. et al.; Effects of Inlet Distortion on the Stability of an Advanced Military Swept Fan Stage with Casing Treatment; Proceedings of GT2005, ASME Turbo Expo 2005; Power for Land, Sea and Air; Jun. 6-9, 2005, Reno-Tahoe, Nevada, USA.

Legras, G.; Flow Mechanisms Induced by Non-Axisymmetric Casing Treatment in a Transonic Axial Compressor; Proceedings of the 10th International Symposium on Experimental Computational Aerothermodynamics of Internal Flows; Jul. 4-7, 2011, Brussels, Belgium; ISAIF10-158.

Biollo, R., et al.; State-of-Art of Transonic Axial Compressors, Advances in Gas Turbine Technology, Dr. Ernesto Benini (Ed.), ISBN: 978-953-307-611-9, InTech, Available from: http://www.intechopen.com/books/advances-in-gas-turbine-technology/state-of-art-of-transonic-axial-compressors; 2011; University of Padova, Italy.

Hanley, B.K.; Effect of Circumferential Groove Casing Treatment Parameters on Axial Compressor Flow Range; Massachusetts Institure of Technology; 2010. [http://hdl.handle.net/1721.1/59675].

* cited by examiner

ROTORS WITH STALL MARGIN AND EFFICIENCY OPTIMIZATION AND METHODS FOR IMPROVING GAS TURBINE ENGINE PERFORMANCE THEREWITH

TECHNICAL FIELD

The present invention generally relates to gas turbine engines, and more particularly relates to rotors with stall margin and efficiency optimization and methods for improving gas turbine engine performance therewith.

BACKGROUND

Gas turbine engines may be used to power various types of vehicles and systems. A gas turbine engine may include, for example, five major sections: a fan section, a compressor section, a combustor section, a turbine section, and an exhaust section. The fan section includes a fan that induces air from the surrounding environment into the engine and passes a fraction of this air toward the compressor section. The compressor section raises the pressure of the air it receives from the fan section and directs the compressed air into the combustor section where it is mixed with fuel and ignited. The high-energy combustion mixture then flows into and through the turbine section, thereby causing rotationally mounted turbine blades to rotate and generate energy. The combustion mixture exiting the turbine section is exhausted from the engine through the exhaust section. The remaining fraction of air induced into the fan section is transitioned through a bypass plenum and exhausted through a mixer nozzle.

The fan includes at least one rotor. In some engines, the compressor section is implemented with a combination of one or more axial compressors, mixed flow and/or centrifugal stages. An intermediate-pressure (IP) compressor (also known as a "booster") may be included in some engines between the fan and a high-pressure (HP) compressor, to supercharge or boost the HP compressor helping to raise the overall pressure ratio of the engine cycle to higher levels. Both the IP and HP compressors have one or more stages comprised of a rotor and a stator. Each of the fan and compressor rotors has a plurality of rotor blades. The plurality of rotor blades are spaced in a circumferential direction around a rotor hub 2 located coaxially around a longitudinal centerline axis. Each rotor blade 1 has a pressure sidewall 3 and a circumferentially opposing suction sidewall 4 extending in a radial direction between a root 6 and a tip 7 and in an axial direction between the leading edge 9 and a trailing edge 11. As the fan and compressor rotors rotate, the rotor blades add energy to the flow and increase total pressure while the downstream stator diffuses the flow and raises the static pressure. "Stall margin" is defined as the difference between operation of the compressor and the conditions that would be required to cause stall to occur. During design, enough margin is required to insure the fan and compressors will not stall anywhere in the allowable operating range. Engine surge can result from encountering stall and, if not properly addressed, may adversely impact engine performance, durability, and flight safety. During compressor operation, stall occurs when the stream momentum imparted to the air by the rotor blades is insufficient to overcome the pressure rise across the compressor, resulting in a reduction, local reversal, or instabilities in the compressor airflow. These aerodynamic flow conditions can cause the engine to surge.

Therefore, fundamental in fan and compressor design for aircraft gas turbine engines is efficiency in compressing the air with sufficient stall margin over the entire flight envelope of operation from takeoff, cruise, and landing. However, compressor efficiency and stall margin are normally inversely related with increasing efficiency corresponding with a decrease in stall margin. The conflicting requirements of stall margin and efficiency are particularly demanding in high performance aircraft gas turbine engines that require increased cycle pressure ratio and increased efficiency while maintaining adequate stall margin for safe operation. In conventional designs, efficiency is usually sacrificed in order to achieve required stall margin and required operability.

Figure 1:
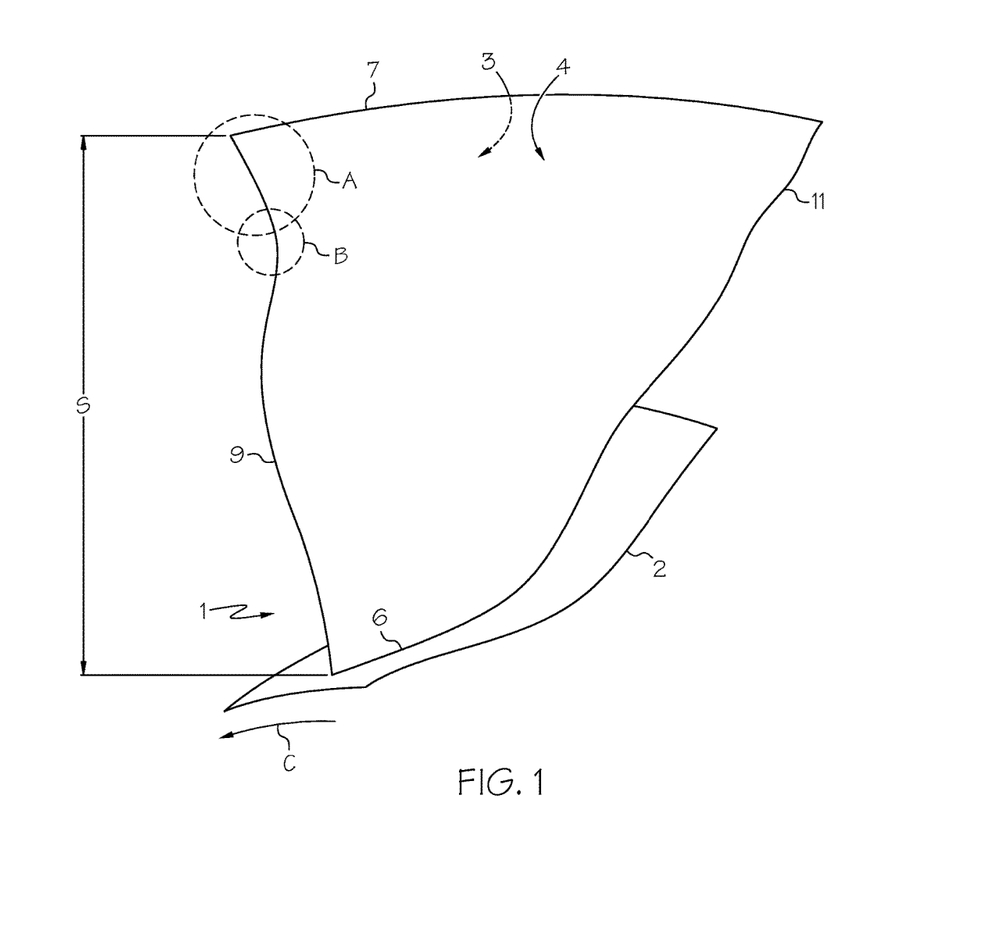
FIG. 1 is an isometric view of a conventional forward tip swept rotor blade mounted on a rotor hub.
Figure 2:
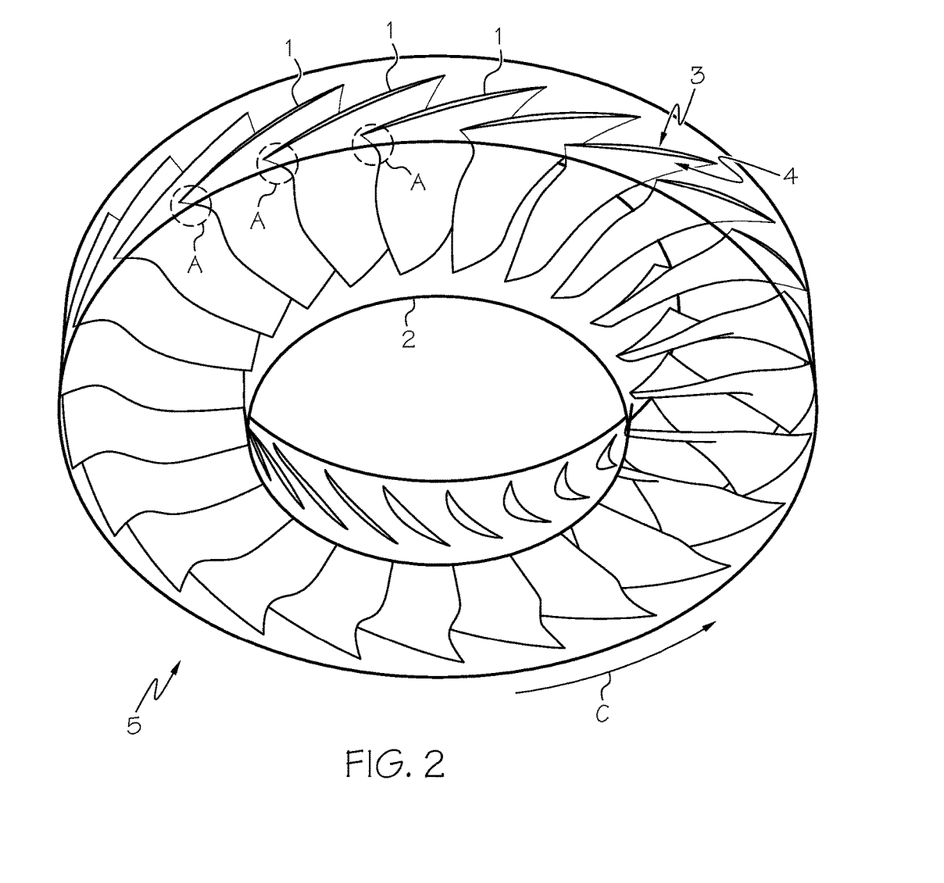
FIG. 2 is an isometric view of a conventional rotor including a plurality of conventional forward tip swept rotor blades of FIG. 1.

Mechanisms have been devised to extend the stable operating range of the fan and compressor (i.e., extend the range to stall). For example, rotor casing treatments are added after design of the rotor has been completed to increase the stall margin, but usually are associated with an efficiency penalty. The rotor casing treatments are conventionally added after rotor design if the stall margin is too low. Conventional "forward tip swept rotor blades" (a single forward tip swept rotor blade 1 is depicted in FIG. 1) of a conventional rotor 5 (FIG. 2) (e.g., a fan rotor or a compressor rotor) also increase overall stall margin and have aerodynamic advantages as compared to neutral tip swept rotor blades, but at an efficiency penalty. The "forward tip swept rotor blade" 1 includes an aft sweep extending over most of the rotor blade leading edge 9 with a local zone of forward sweep (encircled region A of FIGS. 1 and 2) near the tip 7 (from about 75% to 100% of the blade span). As used herein, the term "blade span" refers to the geometry of the airfoil 1 or rotor blade that is defined in part by a span dimension S extending radially from the root 6 to the tip 7. Aerodynamic "sweep" is a conventional parameter represented by a sweep angle which is a function of the direction of the incoming air and the orientation of the airfoil surface in the axial, radial, and circumferential or tangential directions. The rotor direction of rotation is identified by arrow C in FIGS. 1 and 2. A forward sweep is denoted by a negative value for the sweep angle. A neutral sweep has zero sweep angle. An aft (or rearward) sweep is denoted by a positive value for the sweep angle. Unfortunately, the transition from the aft sweep along the blade span to the forward sweep (encircled region A) near the tip in conventional forward tip swept rotor blades creates a local transition zone (encircled region B of FIG. 1) of reduced efficiency and reduced range to stall. The forward sweep near the tip is also a mechanical design challenge with an associated risk of forced response and flutter.

Accordingly, it is desirable to provide rotors with stall margin and efficiency optimization and methods for improving gas turbine engine performance therewith. Gas turbine engine stability is increased and specific fuel consumption and turbine operating temperatures in both steady state and transient operations are decreased by using such rotors in components for gas turbine engines, including those operating at high cycle pressure ratios. Furthermore, other desirable features and characteristics of the present invention will become apparent from the subsequent detailed description of the invention and the appended claims, taken in conjunction with the accompanying drawings and this background of the invention.

BRIEF SUMMARY

Methods are provided for improving performance of a gas turbine engine in accordance with exemplary embodiments of the present invention. The gas turbine engine comprises a component having a rotor mounted in a rotor casing and having a plurality of rotor blades. A tip sweep is applied to a leading edge of one or more rotor blades each having a pressure sidewall and a circumferentially opposing suction sidewall extending in a radial direction between a root and a tip and in an axial direction between the leading edge and a trailing edge. One or more blade geometric design parameters are adjusted. A rotor casing treatment is applied to the rotor casing over at least one of the one or more rotor blades. The applying and adjusting steps are performed during design of the rotor and cause a measured stall margin to substantially match a required stall margin with an increase in efficiency of the component to a desired level.

Methods are provided for improving performance of a gas turbine engine comprising a component having a rotor mounted in a rotor casing and having a plurality of rotor blades. In accordance with yet another exemplary embodiment, the method comprises determining a required stall margin for the rotor. A target efficiency level for the component is determined. A tip sweep is applied to one or more rotor blades of the plurality of rotor blades. One or more blade geometric design parameters are optionally adjusted. A rotor casing treatment is applied to the rotor casing above at least one of the one or more rotor blades with the tip sweep. A stall margin of the rotor is measured to obtain a measured stall margin. The measured stall margin is compared with the required stall margin. Efficiency of the component is measured. The steps of applying the tip sweep, adjusting the one or more blade geometric design parameters, and applying the rotor casing treatment are performed during design of the rotor to cause the measured stall margin to substantially match the required stall margin with a corresponding increase in efficiency of the component.

Methods are provided for optimizing efficiency of a component of a gas turbine engine at a required stall margin. In yet another exemplary embodiment, the method comprises designing a rotor having a plurality of rotor blades spaced in a circumferential direction around a rotor hub located coaxially around a longitudinal centerline axis. Each rotor blade has pressure and suction sides extending between leading and trailing edges and longitudinally between a root and a tip. The designing step comprises adjusting one or more blade geometric design parameters and applying a rotor casing treatment to the rotor casing. The rotor casing has an inner surface surrounding the tip of the one or more rotor blades and spaced radially outwardly therefrom. The steps of adjusting the one or more blade geometric design parameters and applying the rotor casing treatment are performed to cause a measured stall margin to substantially match the required stall margin. The rotor is thereafter manufactured per the design for use in the component of the gas turbine engine.

Furthermore, other desirable features and characteristics of the methods and rotors will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments are directed to rotors with stall margin and efficiency optimization and methods for improving gas turbine engine performance therewith. The rotors according to exemplary embodiments of the present invention may be used in components of gas turbine engines that operate at high cycle pressure ratios and otherwise. The efficiency of the component (e.g., a fan or compressor) may be optimized, while simultaneously meeting stall margin requirements. As a result, gas turbine engine specific fuel consumption and turbine operating temperatures are decreased in both steady state and transient operations relative to gas turbine engines that include conventional rotors. The fan rotor according to exemplary embodiments of the present invention may be used in a single-stage fan or in a multi-stage fan (not shown). The compressor rotor according to exemplary embodiments of the present invention may be used in intermediate pressure (IP) compressors or "boosters" (sometimes known as low pressure (LP) compressors) and high pressure (HP) compressors, as well as in mixed flow compressors, centrifugal compressors, ducted fans, and propulsors. Unless otherwise specified, the term "rotor" refers to a fan rotor, a compressor rotor, a mixed flow rotor, a centrifugal impeller, a ducted fan rotor, or a propulsor rotor.

Figure 3:
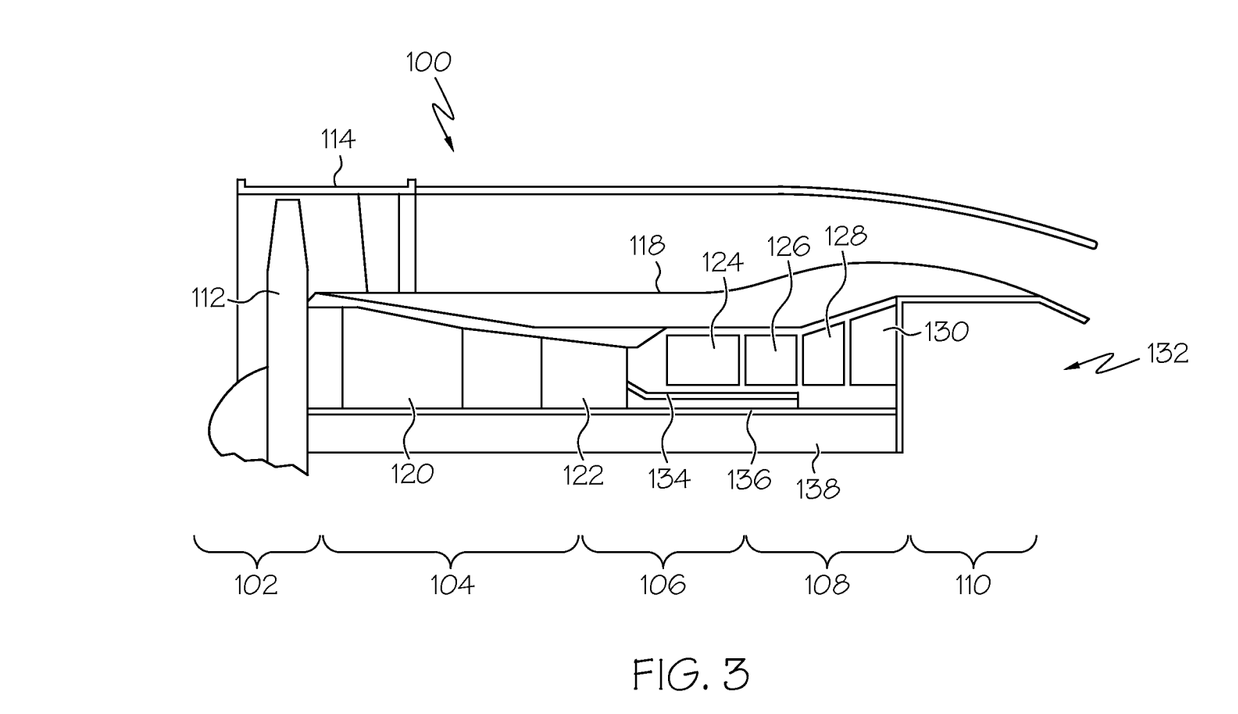
FIG. 3 is a cross-sectional view of an exemplary gas turbine engine including a fan, an intermediate-pressure (IP) compressor, and a high-pressure (HP) compressor.

FIG. 3 is a cross-sectional view of an exemplary gas turbine engine 100 including a fan section 102, a compressor section 104, a combustion section 106, a turbine section 108, and an exhaust section 110. The fan section 102 includes a fan 112 mounted in a fan casing 114. As noted previously, the fan 112 induces air from the surrounding environment into the engine and passes a fraction of this air toward the compressor section 104. The compressor section 104 includes at least one compressor and, in the depicted embodiment, includes an intermediate pressure compressor 120 (also known as a "booster" or LP compressor as noted above) and a high pressure compressor 122. The intermediate pressure compressor 120 raises the pressure of the air directed into it from the fan 112 and directs the compressed air into the high pressure compressor 122. The IP compressor and the HP compressor may be axi-symmetrical about a longitudinal centerline axis 123. The IP and HP compressors are mounted in a compressor casing 118.

Still referring to FIG. 3, the combustion section 106 of gas turbine engine 100 includes a combustor 124 in which the high pressure air from the HP compressor is mixed with fuel and combusted to generate a combustion mixture of air and fuel. The combustion mixture is then directed into the turbine section 108. The turbine section 108 includes a number of turbines disposed in axial flow series. FIG. 3 depicts a high pressure turbine 126, an intermediate pressure turbine 128, and a low pressure turbine 130. While three turbines are depicted, it is to be understood that any number of turbines may be included according to design specifics. For example, a propulsion gas turbine engine may comprise only a high pressure turbine and a low pressure turbine. The combustion mixture from the combustion section 106 expands through each turbine 126, 128, 130, causing them to rotate. As the turbines 126, 128, 130 rotate, each respectively drives equipment in the gas turbine engine 100 via concentrically disposed shafts or spools 134, 136, 138. The combustion mixture is then exhausted through the exhaust section 110.

Figure 4:
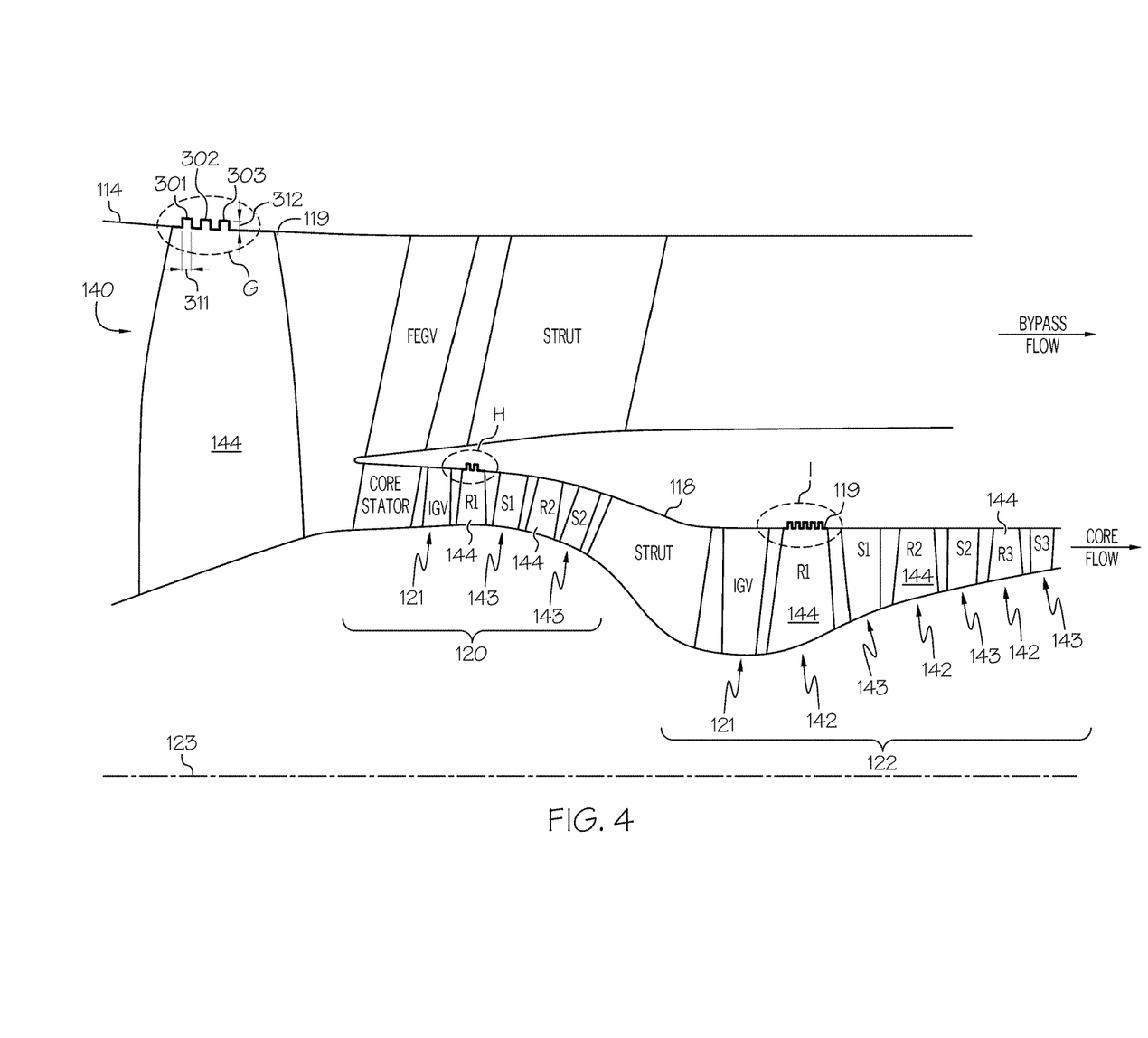
FIG. 4 is a meridional sectional view through a portion of the fan, the IP compressor, and the HP compressor of the exemplary gas turbine engine of FIG. 3, the fan including a fan rotor and the compressors including rotors positioned axially between corresponding stators with an exemplary rotor casing treatment (circumferential grooves) applied over the fan rotor and over the stage 1 IP and HP compressor rotors.

FIG. 4 is a meridional sectional view through a portion of the fan 112, the IP compressor 120, and the HP compressor 122 of the exemplary gas turbine engine of FIG. 3. The fan 112 includes one or more fan rotors 140 (such as the rotor depicted in FIG. 6 and/or the rotor depicted in FIG. 7) mounted in the fan casing 114. The fan 112 may be a single-stage fan or a multi-stage fan having fan stages. The IP and HP compressors include one or more compressor rotors 142 (such as the rotor depicted in FIG. 6 and/or the rotor depicted in FIG. 7) mounted in the compressor casing 118. More particularly, the IP and HP compressors 120 and 122 depicted in FIG. 4 each include an inlet guide vane stage (V1) having a plurality of inlet guide vanes (a single variable inlet guide vane 121 (IGV) in each of the IP compressor and the HP compressor is depicted for ease of illustration in FIG. 4) and one or more compressor stages spaced in a circumferential direction around the longitudinal centerline axis 123. Each compressor stage has a compressor rotor 142 (e.g., R1, R2, and R3 in FIG. 4). Cooperating with each compressor rotor 142 is a corresponding stator vane 143 (e.g., S1, S2, and S3 in FIG. 4). While FIG. 4 depicts a fan 112 with a single fan stage, an IP compressor 120 with two compressor stages and an HP compressor 122 with three compressor stages each stage including a rotor and corresponding stator vane, it is to be understood that the number of fan stages and compressor stages may vary from that depicted, with a greater number of fan stages, and fewer or greater compressor stages.

Figure 6:
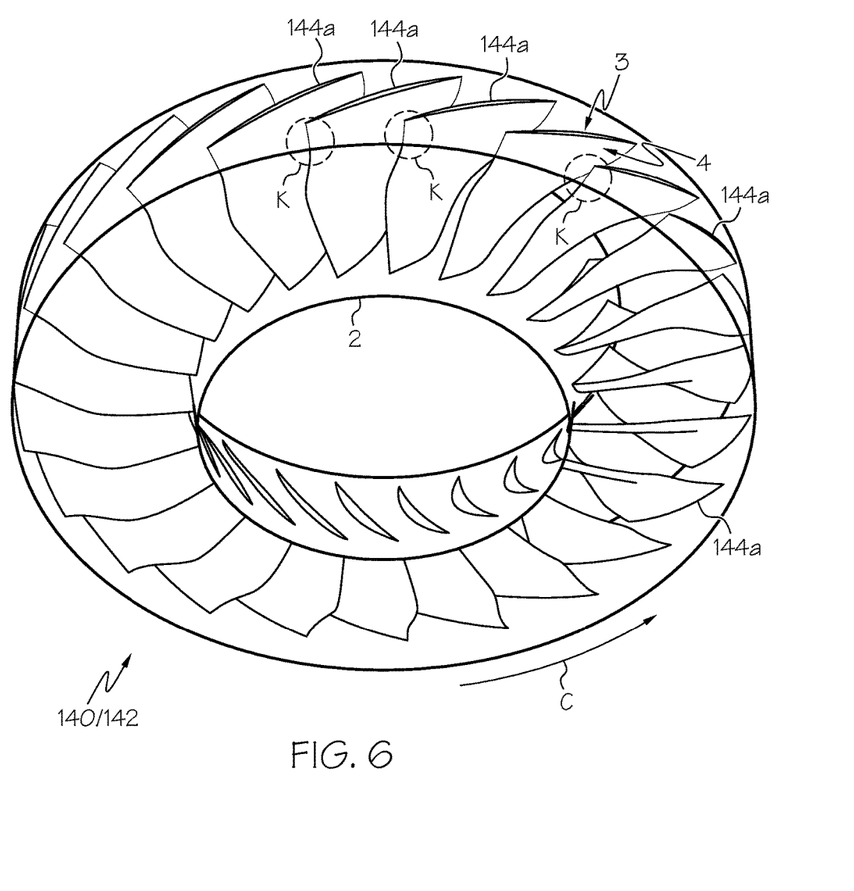
FIG. 6 is an isometric view of one of the rotors that may be used in the exemplary gas turbine engine of FIGS. 3 and 4, the rotor including a plurality of leading edge reduced forward tip swept rotor blades (the rotor casing treatment not shown in FIG. 6), according to exemplary embodiments of the present invention.
Figure 7:
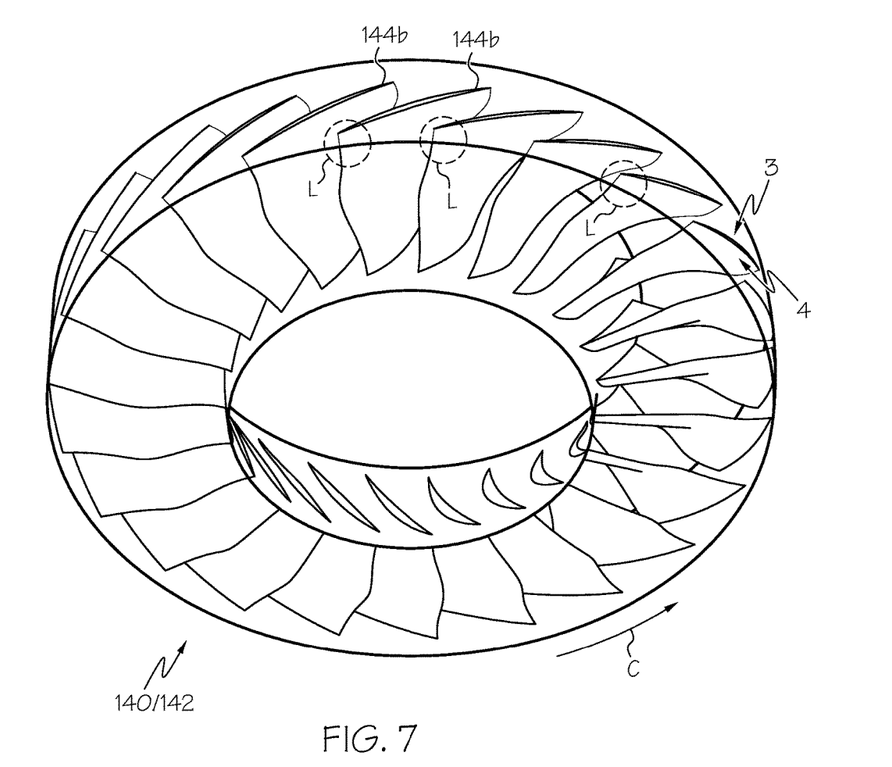
FIG. 7 is an isometric view similar to FIG. 6 of one of the rotors that may be used in the exemplary gas turbine engine of FIGS. 3 and 4, the rotor including a plurality of leading edge aft tip swept rotor blades (the rotor casing treatment not shown in FIG. 7), according to an alternative exemplary embodiment of the present invention.

Still referring to FIG. 4 and now to FIGS. 6 and 7, at least one of the fan rotor(s) 140 or compressor rotor(s) 142 include a plurality of rotor blades 144 rotationally mounted on a rotor hub 2 (FIG. 6) mounted on a shaft (not shown). The rotor hub 2 is located coaxially around the longitudinal centerline axis 123. The plurality of rotor blades 144 extend in a radial direction and are generally spaced apart from one another around the circumference of the rotor hub 2. Each rotor blade includes a generally concave, pressure sidewall 3 and a circumferentially opposite, generally convex suction sidewall 4. The two sidewalls extend radially between a root 6 and an outer tip 7 and axially between a leading edge 9 and a trailing edge 11. The plurality of rotor blades is typically solid and has a generally conical tip 7, although other configurations may be provided. As hereinafter described, in accordance with exemplary embodiments of the present invention, one or more of the plurality of rotor blades 144 in the rotor 140/142 comprise leading edge reduced forward tip swept rotor blades 144a (FIG. 6). The reduced forward tip sweep is in encircled region K of FIG. 6. In another embodiment as depicted in FIG. 7, one or more of the plurality of rotor blades comprise leading edge aft tip swept rotor blades 144b. The aft sweep is in encircled region L of FIG. 7. Other blade geometric design parameters include solidity (ratio of chord/spacing), camber distribution, tip speed, incidence distribution, thickness distribution, chord distribution, hub to tip radius ratio (r-hub/r-tip), inlet specific flow, flowpath convergence, blade lean, etc.

Referring again to FIG. 4, the generally circumferentially arcuate compressor casing 118 surrounds the stator vanes 143 and rotor blades 144 of the compressor 120/122 to at least partially define the compressor flow path ("core flow") with the rotor hub 2. The fan casing 114 (FIGS. 3 and 4) and the compressor casing 118 have an inner surface 119 surrounding the rotor blade tip 7 and spaced radially outwardly therefrom. The inner surface 119 of the fan casing 114 and compressor casing 118 that is in closest proximity to the rotor blade tip 7 is referred to herein as a "rotor casing". During operation, the rotor rotates, and the rotor blades 144 draw mainstream air through the fan 112 and a fraction of the mainstream air into the IP and HP compressors 120/122. As the mainstream air flows axially downstream between the rotor blades and the stator vanes, it is pressurized and directed through the rotor and stator stages, as desired, for further compression. The rotor blades 144a and 144b (and stator vanes) define airfoils having corresponding aerodynamic profiles or contours for pressurizing the mainstream air flow successively in axial stages. In operation, pressure of the air is increased as the air decelerates and diffuses through the stator and rotor airfoils.

Figure 5:
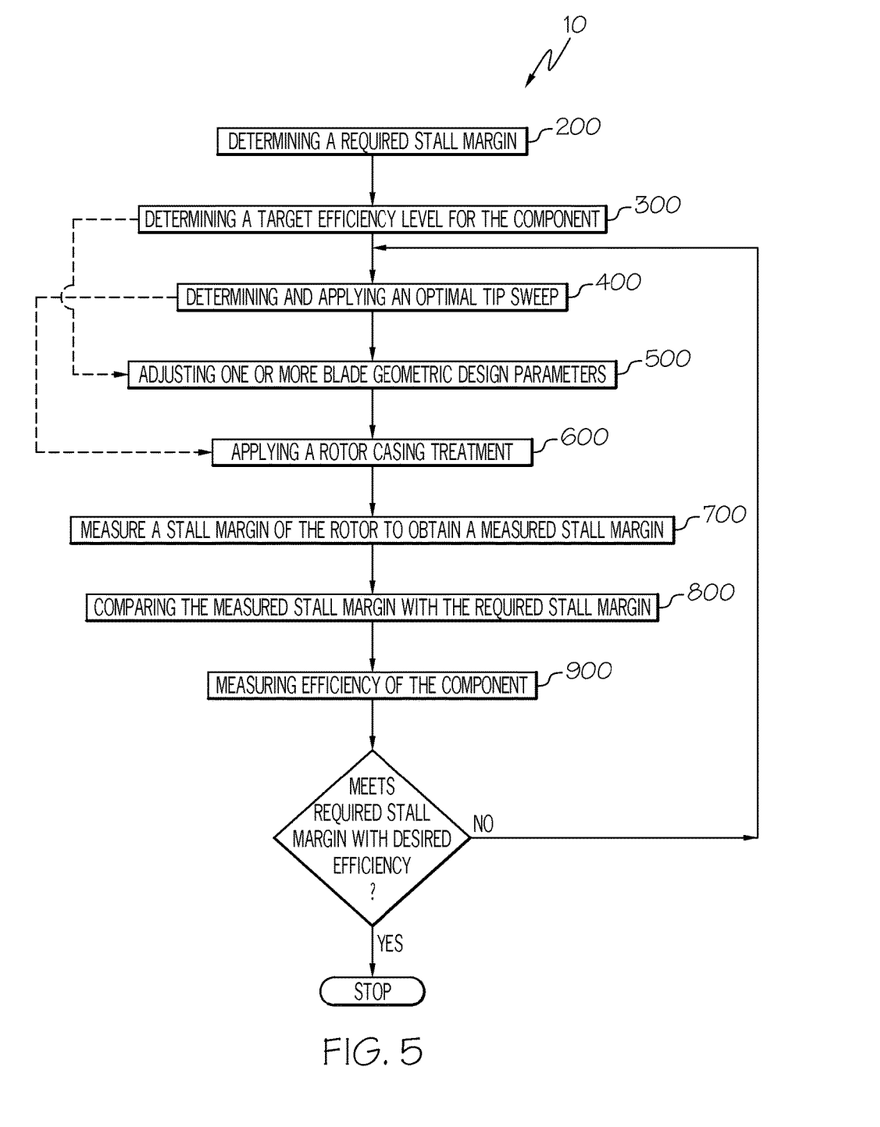
FIG. 5 is a flow diagram of a method for improving gas turbine engine performance, according to exemplary embodiments of the present invention.

Referring now to FIG. 5, according to exemplary embodiments of the present invention, a method 10 for improving gas turbine engine performance begins by determining a required stall margin for the component (e.g., fan, compressor, propulsor) (step 200). The required stall margin is determined by engine modeling techniques well known in the art. The required stall margin comprises a stall margin that defines a safe operating range in which system aerodynamic stability free of surge is determined. The required stall margin can be determined analytically, by testing, or both. Each fan and/or compressor stage can be analyzed or tested to determine its available stall margin that contributes to the required stall margin of the component.

Still referring to FIG. 5, according to exemplary embodiments of the present invention, the method 10 for improving gas turbine engine performance continues by determining a target efficiency level for the component (step 300). The target efficiency level comprises a number of engine performance factors such as specific fuel consumption and turbine operating temperatures in both steady state and transient operations. Component efficiency can be determined analytically, by testing, or both.

Figure 8:
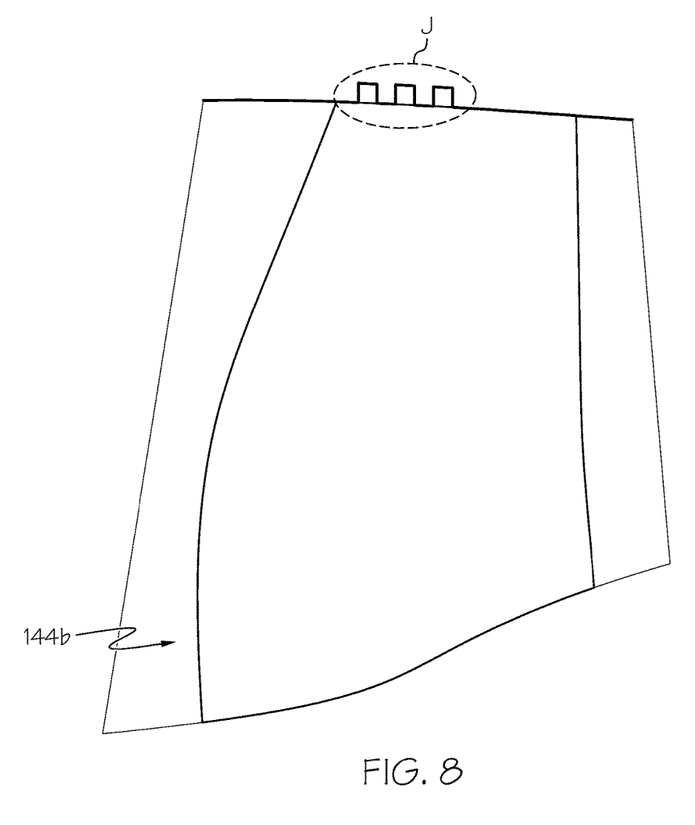
FIG. 8 is a meridional view of a portion of the rotor of FIG. 7, illustrating a leading edge aft tip swept rotor blade thereof and an exemplary rotor casing treatment (circumferential grooves) according to exemplary embodiments of the present invention.

Still referring to FIG. 5, and now to FIGS. 6 and 8, according to exemplary embodiments of the present invention, the method 10 for improving gas turbine engine performance continues by determining an optimum tip sweep angle for the leading edge of one or more rotor blades of the plurality of rotor blades 144 in the rotor under design that causes an increase in efficiency of the component, an increase in stall margin, or both (step 400). The optimum near tip sweep angle(s) may be determined analytically, by testing, or both. A tip sweep at the optimum near tip sweep angle may be applied (again, analytically, by testing, or both) near the tip of the leading edge of one or more rotor blades in the rotor under design. The tip sweep may be a negative tip sweep, a neutral tip sweep, or a positive tip sweep, as hereinafter described. The negative tip sweep results in a leading edge forward tip swept rotor blade (such as in the conventional leading edge forward tip swept rotor blade of FIGS. 1 and 2 or the leading edge reduced forward tip swept rotor blade of FIG. 6). The forward sweep of the leading edge reduced forward tip swept rotor blade of FIG. 6 is reduced relative to the forward sweep of the conventional leading edge forward tip swept rotor blade of FIGS. 1 and 2. The neutral tip sweep results in a leading edge neutral tip swept rotor blade. The positive tip sweep results in an aft tip swept rotor blade. The conventional local zone of forward sweep (encircled region "A" in FIG. 1) near the tip and the transition zone (encircled region "B" in FIG. 1) from aft to forward sweep, found in conventional forward tip swept rotor blades 1 (FIG. 1), are reduced in the leading edge reduced forward tip swept rotor blades 144a (FIG. 6) and absent in the leading edge aft tip swept rotor blades 144b (FIG. 7) of the rotors 140/142 according to exemplary embodiments of the present invention. As noted previously, aerodynamic sweep is a conventional parameter represented by a local sweep angle which is a function of the direction of the incoming air and the orientation of the airfoil surface in the axial, radial, and circumferential or tangential directions. As noted previously, a forward sweep is denoted by a negative value for the sweep angle. An aft (or rearward) sweep is denoted by a positive value for the sweep angle. The leading edge reduced forward sweep may be reduced at the tip only relative to conventional forward swept rotor blades or the leading edge reduced forward sweep may be reduced starting from any span location along the blade leading edge up to the tip.

Figure 9:
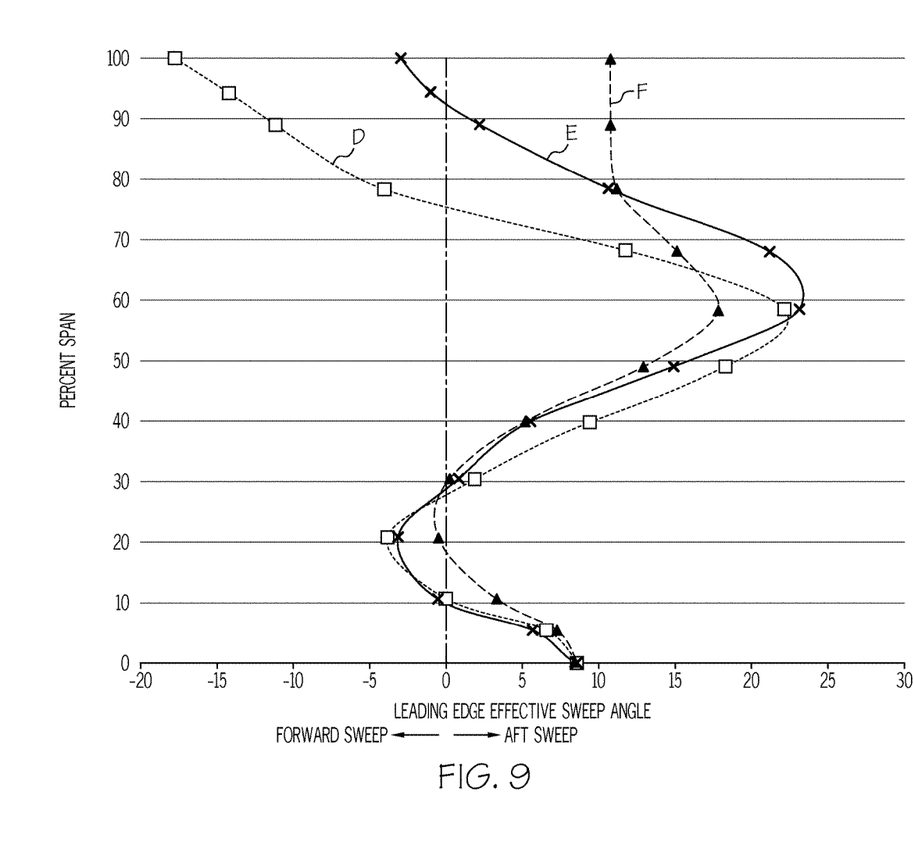
FIG. 9 is a comparison of exemplary sweep angles for the conventional forward tip swept rotor blade(s) of FIGS. 1 and 2 with exemplary sweep angles for the leading edge reduced forward tip swept rotor blades depicted in FIG. 6 and the leading edge aft tip swept rotor blades depicted in FIG. 7, according to exemplary embodiments of the present invention.

FIG. 9 compares exemplary sweep angles for conventional forward swept rotor blades, leading edge reduced forward tip swept rotor blades 144a (such as depicted in FIG. 6) with a reduced forward sweep from 60% span to the blade tip, and leading edge aft tip swept rotor blades 144b (such as depicted in FIG. 7). Line D represents exemplary sweep angles for the conventional forward tip swept rotor blade 1 (FIG. 1). Line E represents exemplary sweep angles for the leading edge reduced forward tip swept rotor blade 144a (FIG. 6) and Line F represents exemplary sweep angles for the leading edge aft tip swept rotor blade 144b (FIG. 7) according to exemplary embodiments of the present invention. Unlike the conventional forward tip swept rotor blade 1 of FIG. 1 in which there is a transition to forward sweep at 75% span, the exemplary leading edge aft tip swept rotor blade 144b has an aft sweep (a positive sweep angle) from about 30% span all the way to the tip. The aft positive sweep angle(s) is/are as large as practicable. In this way, the leading edge 9 remains aft swept relative to the mainstream air over the entire high Mach number outboard sections of the airfoil ("core flow" in FIG. 4). Use of leading edge reduced forward tip swept rotor blades or leading edge aft tip swept rotor blades increases component efficiency but reduces the stall margin, causing a loss in engine stability. The increase in efficiency from reduced forward or aft sweep can reduce stall margin to levels below engine requirements. The optimization of both efficiency and stall margin is necessary to achieve the required stall margin at the highest possible efficiency. By simultaneously optimizing tip sweep, one or more blade geometric design parameters, and applying a rotor casing treatment (steps 400, 500, and 600) during rotor design as hereinafter described, the required stall margin can be achieved with optimized fan and compressor efficiency, and reduced mechanical design complexity and flutter risk.

While performance of steps 400, 500, and 600 are hereinafter described as being performed substantially simultaneously to cause a measured stall margin to substantially match a required stall margin with an increase in efficiency of the component, it is to be understood that the applying a tip sweep step (step 400) or the adjusting one or more blade geometric parameters step (step 500) may be optional, if the two other optimization steps cause the measured stall margin to substantially match the required stall margin with the increase in efficiency to a desired level. During the adjustment process, structural and aeroelastic concerns also have to be addressed as known to one skilled in the art. There are no specific requirements for the trailing edge of the rotor blade. The trailing edge shape is modified to maintain aerodynamic characteristics in the blade passage and for mechanical considerations.

Still referring to FIG. 5, according to exemplary embodiments of the present invention, the method 10 for improving gas turbine engine performance continues by adjusting one or more blade geometric design parameters such as solidity (ratio of chord/spacing), camber distribution, tip speed, incidence distribution, thickness distribution, chord distribution, hub to tip radius ratio (r-hub/r-tip), inlet specific flow, flowpath convergence, blade lean, etc. (step 500). Such blade geometric design parameters may be adjusted by methods well known in the art. The one or more blade geometric design parameters can be adjusted analytically, by testing, or both. As noted previously, the step of adjusting one or more blade geometric design parameters may be optional if the steps of applying the tip sweep and the rotor casing treatment (steps 400 and 600) cause the measured stall margin to substantially match the required stall margin with the increase in efficiency to the desired level.

Referring again to FIGS. 4 through 5 and 8, according to exemplary embodiments, the method 10 for improving gas turbine engine performance continues by applying a rotor casing treatment to the rotor casing 119 over at least one of the one or more rotor blades having the tip sweep (step 600). The rotor casing treatment is applied to the rotor casing during rotor design, rather than conventionally adding the rotor casing treatment to increase stall margin after the rotor design has been completed.

FIG. 4 depicts an exemplary rotor casing treatment (encircled region G) applied to the rotor casing 119 over a leading edge aft tip swept rotor blade 144 of the fan rotor 140. FIG. 4 also depicts exemplary rotor casing treatments (encircled regions H and I) over the tip of a leading edge aft tip swept rotor blade 144 of the stage 1 IP compressor rotor 142 (encircled region H) and the stage 1 HP compressor rotor 142 (encircled region I). FIG. 8 depicts an exemplary rotor casing treatment (encircled region J) over a leading edge aft tip swept rotor blade 144b. As noted previously, rotor casing treatments conventionally added after design of the rotor have been shown to provide a stability benefit and improve stall margin, yet with an efficiency neutral or an efficiency penalty. Reducing the leading edge forward sweep from that of a conventional forward sweep (see, e.g., FIG. 9) or applying a leading edge aft sweep results in improved efficiency at a reduction in stall margin and the rotor casing treatment causes an increase in the measured stall margin. Designs of rotor casing treatments used to increase stall margin as known in the art vary considerably from simple axisymmetric circumferential grooves in the rotor casing as depicted in FIGS. 4 and 8 to more complex arrangements of slots, injector recesses, air injection, etc. (not shown). As noted previously, the term "rotor casing" includes the inner surface of the fan casing, the compressor casing, or both that is closest to the tip of the one or more rotor blades having the tip sweep.

Referring again to FIG. 4, the exemplary rotor casing treatment G over the fan rotor 140 includes a series of circumferential grooves 301-303 on the inner surface (rotor casing) 119 extending over the leading edge portion of the tip 7 of the leading edge aft tip swept rotor blade 144 in fan rotor 140. In particular, FIG. 4 illustrates the tip 7 of the leading edge aft tip swept rotor blade 144 (the aft sweep not shown in FIG. 4) and the inner surface 119 (i.e., the rotor casing) of the fan casing. Grooves 301-303 include a first groove 301, a second groove 302, and a third groove 303 extending sequentially in a downstream direction.

Still referring to FIG. 4, the exemplary rotor casting treatment H on the inner surface (rotor casing) over the leading edge aft tip swept rotor blade of the stage 1 IP compressor rotor 142 in stage 1 of the IP compressor 120 comprises grooves 301-302. Stage 1 of the HP compressor 122 comprises grooves 301-305. Grooves 301-305 include a first groove 301, a second groove 302, a third groove 303, a fourth groove 304, and a fifth groove 305 extending sequentially in a downstream direction. The series of circumferential grooves cover at least the front portion (the leading edge) of the leading edge aft tip swept rotor blades and extend downstream. Generally, the depicted grooves 301-303, 301-302, and 301-305 extend from the leading edge 9 downstream toward the trailing edge 11 of the leading edge aft tip swept rotor blade 144, although in other embodiments, the grooves may corresponds to the length of the rotor blade 144, i.e., from the leading edge 9 to the trailing edge 11. While rotor casing treatments are depicted in FIG. 4 as located over the stage 1 IP and HP compressor rotors, it is to be understood that the rotor casing treatment may be applied to the rotor casing in alternative or additional rotor stage(s), as long as the required stall margin is substantially matched. FIGS. 7 and 8 depict an exemplary leading edge aft swept rotor blade 144b of rotor 140/142 with the aft sweep extending the entire blade span and in particular, from about 60% to about 100% of the blade span (the aft tip sweep is in encircled region L in FIG. 7) and the rotor casing treatment (encircled region J in FIG. 8) comprising the series of circumferential grooves on the inner surface (rotor casing), according to exemplary embodiments of the present invention. As noted previously, the conventional forward tip swept rotor blade includes an aft sweep extending over most of the rotor blade leading edge 9 with a local zone of forward sweep (encircled region A of FIGS. 1 and 2) near the tip 7 (from about 75% to 100% of the blade span).

While the depicted rotor casing treatments of FIG. 4 include three grooves (encircled region G), two grooves (encircled region H), and five grooves (encircled region I), it is to be understood that the location and number of grooves of the rotor casing treatment may vary. It is also to be understood that the number of grooves in the rotor casing treatment over the fan rotor may be greater, lesser, or the same as the number of grooves in the rotor casing treatment over the compressor rotor(s). It is also to be understood that a rotor casing treatment may be used over the fan rotor(s), IP compressor rotors, HP compressor rotors, or combinations thereof. Each groove of the rotor casing treatment may be defined by a length 311, a depth 312 and a width (not shown in FIG. 4). Although the depicted grooves extend in a circumferential direction that is perpendicular to the flow of mainstream air ("core flow"), the grooves may also extend in a general circumferential direction that is not exactly perpendicular, such as in a helical or in an asymmetric slot arrangement. Each of the grooves may be separated from adjacent grooves by a circumferential wall or rib (not shown). The grooves may be generally inverted U-shaped with a flat bottom, although other embodiments may have different shapes, including rounded bottoms or inverted V-shapes. Although the cross-sectional shape of the grooves is depicted as rectangular, any cross-sectional shape may be provided. Other configurations for the rotor casing treatment may be provided. For example, it is to be understood that rotor casing treatments other than circumferential grooves may be used to increase the stall margin. While the depicted configuration for the rotor casing treatment over the fan rotor and over the compressor rotor is the same (except for the number of grooves), it is to be understood that the configuration for the rotor casing treatments may differ between rotors in the same gas turbine engine. In general, the particular rotor casing treatment is selected in order to increase the stall margin, toward the level of the required stall margin.

Still referring to FIG. 5, according to exemplary embodiments of the present invention, the method 10 for improving gas turbine engine performance continues by measuring a stall margin of the rotor to obtain a measured stall margin (step 700), comparing the measured stall margin with the required stall margin (step 800), and measuring efficiency of the component (step 900). Steps 700, 800, and 900 may be performed at any time and repeated during the optimization process to determine whether steps 400 through 600, 400 and 600, or 500 and 600 have caused the measured stall margin to substantially match the required stall margin and to optimize efficiency of the component at the required stall margin (i.e., to cause a corresponding increase in the efficiency of the component to a desired level). While steps 400 through 900 are described sequentially above, it is to be understood that steps 400 through 900 may be performed simultaneously, in any order, to cause the measured stall margin to substantially match the required stall margin and to optimize efficiency of the component at the required stall margin. The tip sweep and rotor casing treatment are adjusted along with the blade geometric design parameters until the measured stall margin substantially matches the required stall margin and the efficiency of the component is optimized at the required stall margin. The terms "measuring the stall margin" may refer to analytically determining the stall margin or testing the stall margin. Similarly, the term "measured stall margin" may refer to an analytically determined stall margin or a tested stall margin. As used herein, the term "optimized" or the like refers to an increase in component efficiency. As noted previously step 400 or step 500 may be optional.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. A method for improving performance of a gas turbine engine comprising a component having a rotor, the rotor mounted in a rotor casing and having a plurality of rotor blades, the method comprising:
    applying a tip sweep to a leading edge of one or more rotor blades of the plurality of rotor blades, the one or more rotor blades each having a pressure sidewall and a circumferentially opposing suction sidewall extending in a radial direction between a root and a tip and in an axial direction between the leading edge and a trailing edge, each of the one or more rotor blades having a blade span defined in the radial direction between the root and the tip;
    adjusting one or more blade geometric design parameters; and
    applying a rotor casing treatment to the rotor casing over at least one of the one or more rotor blades having the tip sweep,
    wherein the steps of applying the tip sweep, adjusting the one or more blade geometric design parameters, and applying the rotor casing treatment are performed simultaneously to cause a measured stall margin to match a required stall margin and to optimize efficiency of the component at the required stall margin, and
    wherein the steps of applying the tip sweep, adjusting one or more blade geometric design parameters, and applying the rotor casing treatment are performed during design of the rotor to cause the measured stall margin to substantially match the required stall margin with an increase in efficiency of the component to a desired level.

2. The method of claim 1, wherein the rotor comprises a compressor rotor, a compressor impeller, a mixed flow rotor, a fan rotor, or a propulsor rotor.

3. The method of claim 1, wherein applying the tip sweep comprises applying a positive sweep angle to the leading edge from a point on the blade span to the tip of the one or more rotor blades.

4. The method of claim 1, further comprising the step of determining the rotor casing treatment that causes an increase in the measured stall margin.

5. The method of claim 1, further comprising the steps of:
    measuring the stall margin to obtain the measured stall margin; and
    comparing the measured stall margin with the required stall margin.

6. The method of claim 5, wherein the measuring and comparing steps are performed after one or more of the steps of applying the tip sweep, adjusting the one or more blade geometric design parameters, and applying the rotor casing treatment.

7. The method of claim 1, wherein the steps of applying the tip sweep, adjusting one or more blade geometric design parameters, and applying the rotor casing treatment are performed analytically, by testing, or both.

8. The method of claim 3, further comprising the step of determining the positive sweep angle for a positive sweep that causes an increase in efficiency of the component.

9. A method for improving performance of a gas turbine engine comprising a component having a rotor mounted in a rotor casing and having a plurality of rotor blades, the method comprising the steps of:
    determining a required stall margin for the rotor;
    determining a target efficiency level for the component;
    applying a tip sweep to one or more rotor blades of the plurality of rotor blades, each of the one or more rotor blades having pressure and suction sides extending between leading and trailing edges and longitudinally between a root and a tip and having a blade span defined in the radial direction between the root and the tip, wherein applying the tip sweep comprises determining a positive sweep angle for a positive sweep that causes an increase in efficiency of the component and applying the positive sweep angle to the leading edge from a point on the blade span to the tip of the one or more rotor blades;
    optionally adjusting one or more blade geometric design parameters;
    applying a rotor casing treatment to the rotor casing above at least one of the one or more rotor blades with the tip sweep;

measuring a stall margin of the rotor to obtain a measured stall margin;

comparing the measured stall margin with the required stall margin;

measuring an efficiency of the component;

determining, based on the comparing of the measured stall margin with the required stall margin, whether the steps of applying the tip sweep and applying the rotor casing treatment has caused the measured stall margin to substantially match the required stall margin;

based on a determination that the measured stall margin does not match the required stall margin, adjusting the applied tip sweep and the applied rotor casting, and repeating the measuring, comparing, measuring and determining steps;

based on a determination that the measured stall margin matches the required stall margin, determining, based on the measured efficiency of the component, whether the efficiency of the component is optimized at the required stall margin; and based on a determination that the efficiency of the component is optimized at the required stall margin, manufacturing the rotor per the design for use in the component of the gas turbine engine.

10. The method of claim 9, wherein the rotor comprises a fan rotor, a compressor rotor, a mixed flow rotor, a centrifugal impeller, a ducted fan, or a propulsor rotor.

11. The method of claim 9, further comprising the step of determining the rotor casing treatment that causes an increase in the measured stall margin.

12. The method of claim 9, wherein the steps of measuring a stall margin, comparing the measured stall margin, and measuring efficiency are performed after one or more of the steps of applying the tip sweep, adjusting the one or more blade geometric design parameters, and applying the rotor casing treatment.

13. The method of claim 9, wherein the steps of applying the tip sweep, adjusting the one or more blade geometric design parameters, and applying the rotor casing treatment are performed substantially simultaneously to cause the measured stall margin to match the required stall margin with the corresponding increase in the efficiency of the component.

14. The method of claim 9, wherein the steps of applying the tip sweep, adjusting one or more blade geometric design parameters, and applying the rotor casing treatment are performed analytically, by testing, or both.

15. A method for optimizing efficiency of a component of a gas turbine engine at a required stall margin, the method comprising:

designing a rotor having a plurality of rotor blades spaced in a circumferential direction around a rotor hub located coaxially around a longitudinal centerline axis, each rotor blade having pressure and suction sides extending between leading and trailing edges and longitudinally between a root and a tip, each rotor blade having a blade span defined in a radial direction between the root and the tip, wherein the step of designing a rotor comprises:

adjusting one or more blade geometric design parameters;

applying a rotor casing treatment to a rotor casing, the rotor casing having an inner surface surrounding the tip of the one or more rotor blades and spaced radially outwardly therefrom;

applying a tip sweep to the leading edge of one or more rotor blades of the plurality of rotor blades simultaneously with the steps of adjusting the one or more blade geometric design parameters and applying the rotor casing treatment;

measuring a stall margin of the rotor to obtain a measured stall margin;

comparing the measured stall margin with the required stall margin;

measuring an efficiency of the component;

determining, based on the comparing of the measured stall margin with the required stall margin, whether the steps of applying the tip sweep and applying the rotor casing treatment has caused the measured stall margin to substantially match the required stall margin;

based on a determination that the measured stall margin does not match the required stall margin, adjusting the applied tip sweep and the applied rotor casting, and repeating the measuring, comparing, measuring and determining steps;

based on a determination that the measured stall margin matches the required stall margin, determining, based on the measured efficiency of the component, whether the efficiency of the component is optimized at the required stall margin; and based on a determination that the efficiency of the component is optimized at the required stall margin, manufacturing the rotor per the design for use in the component of the gas turbine engine.

16. The method of claim 15, wherein the rotor comprises a fan rotor, a compressor rotor, a mixed flow rotor, a centrifugal impeller, a ducted fan, or a propulsor rotor.

17. The method of claim 15, wherein the step of applying the tip sweep comprises applying a positive sweep angle to the leading edge from about 30% of the blade span to the tip of the one or more rotor blades of the plurality of rotor blades.

* * * * *